United States Patent [19]
Saxod et al.

[11] Patent Number: 4,957,680
[45] Date of Patent: Sep. 18, 1990

[54] PROCESS OF MOLDING SEAL RINGS

[75] Inventors: Michel Saxod; Serge Devouassoux, both of Lagres; Michel Marchiset, Chalindrey; Jean-Pierre Jaumot, Langres, all of France

[73] Assignee: Procal, Langres, France

[21] Appl. No.: 847,330

[22] Filed: Apr. 2, 1986

[30] Foreign Application Priority Data

Apr. 3, 1985 [FR] France ................. 85 05054

[51] Int. Cl.$^5$ ............ B29C 45/14; B29C 45/22; B29C 45/38
[52] U.S. Cl. ................ 264/161; 29/527.1; 264/266; 264/296; 264/328.2; 425/DIG. 47
[58] Field of Search ............ 264/161, 266, 275, 279, 264/279.1, 296, 328.2, 328.8, 571, DIG. 64, 101, 102; 425/DIG. 47; 29/527.1; 277/1, 152, 165, 223, 228, DIG. 6

[56] References Cited

U.S. PATENT DOCUMENTS

| | | | |
|---|---|---|---|
| 3,063,097 | 11/1962 | Jutzi . | |
| 3,754,846 | 8/1973 | Choate | 425/DIG. 47 |
| 3,950,119 | 4/1976 | Reichenbach | 425/127 X |
| 4,239,243 | 12/1980 | Bainard et al. | 277/223 X |
| 4,258,927 | 3/1981 | Cather, Jr. | 277/152 |
| 4,331,316 | 1/1982 | Cather, Jr. | 277/1 |
| 4,406,847 | 9/1983 | O'Neal et al. | 264/266 X |
| 4,555,376 | 11/1985 | Butler | 264/266 |

FOREIGN PATENT DOCUMENTS

| | | |
|---|---|---|
| 3329386 | 11/1984 | Fed. Rep. of Germany . |
| 1508575 | 1/1967 | France . |
| 2340195 | 9/1977 | France . |
| 2373003 | 6/1978 | France . |
| WO80/01832 | 9/1980 | PCT Int'l Appl. ........ 277/223 |

*Primary Examiner*—Jeffery Thurlow
*Assistant Examiner*—Leo B. Tentoni
*Attorney, Agent, or Firm*—Hoffman, Wasson, Fallow & Gitler

[57] ABSTRACT

The seal ring is molded by positioning a frame or reinforcement in one part of an opened mold, and positioning a low friction material disc on a clamping surface of the same part of the mold. The mold is closed with a second part so that between 30% and 70% of the disc is clamped and squeezed between opposed surfaces of the mold parts, and the reinforcement or frame is held in position in the closed mold. A vacuum is drawn in the mold, and an elastomer is injected to form a body or lip connecting the reinforcement to the disc. The molded ring is removed from the mold and excess lip material and at least the portion of the disc which was clamped are cut off to form the finished seal ring. The low friction material disc can contain PTFE.

5 Claims, 3 Drawing Sheets

PROCESS OF MOLDING SEAL RINGS

The present invention relates to a process for molding seal rings of the type comprising a frame or reinforcement, a seal lip adhered to the frame and formed from a body, particularly an elastomer, and an active seal bearing surface in the form of a low-friction facing, noteably of a fluorine-containing resin such as in particular, polytetrafluorethylene (PTFE).

Seal rings of this type are, for example, described in French Pat. No. 1 508 575.

Numerous processes for molding such rings have already been proposed and the processes described in European Pat. No. 0 025 062 and European patent application 0 113 663 could be cited by way of example.

As disclosed in these documents, a frame or reinforcement, a disk or washer of resin, especially PTFE, and at least one elastomer preform, are placed in a mold, after which the mold is closed and the ring is formed through application of heat and pressure, the elastomer filling the cavity of the mold. After the ring is taken out of the mold, the excess portions of the lip are cut off and, in the case of radial seal rings, an annular gasket spring is insert in the seal ring.

Such molding procedures have, as a first disadvantage, the fact that they require first molding one or several preform pieces of elastomer, which increases the manufacturing costs and makes automation of the process difficult.

Another disadvantage of these molding procedures by compression comes from the fact that it is difficult to precisely control the position of the disk or washer of PTFE during molding, especially during the step of closing the mold, due to the presence of the elastomer preform between the disk and the wall of the mold.

SUMMARY OF THE INVENTION

The present invention has as an object a molding process eliminating the disadvantages of the prior processes and which is also rapid, economical, easy to automate, and which lends itself to the manufacture of a variety of different shapes of rings.

The process according to the invention is characterized by the fact that there are placed in an open mold a metal frame and an annular disk or washer of low-friction material, particularly of a resin such as PTFE (which material will hereafter be called "resin"), that the mold is closed so as to directly clamp and squeeze the resin disk between two facing parts of the mold, on a crown portion or rim whose width is between about 30% and 70% of the width of the disk, that a vacuum is created in the mold cavity, and there is injected into it the material, especially elastomer, which forms the seal lip, that the molded ring is ejected after the mold is opened, and the excess portion of the lip is cut off, including at least that portion of the crown of the disk which was clamped and pinched when the mold was closed.

In one preferred embodiment of the invention, the injection of the material which forms the seal lip is carried out by means of several off-center or eccentric channels spaced circumferentially in a part of the mold opposite the part in which the frame and the resin disk are placed.

Preferably, the injection channels are so located as to be spaced outwardly from the crown portion of the resin disk which is clamped during the closing of the mold, by a distance equal to at least four times the thickness of the disk.

Preferably, according to the invention, the clamping and pinching or squeezing of the resin disk in the mold is sufficient to cause a reduction in thickness of between 3% and 9% of the original thickness of the disk, i.e. the clamped portion is compressed to between 91% and 97% of its original thickness.

In order to make the invention better understood, one embodiment will now be described as a non-limiting example with reference to the accompanying drawings.

DETAILED DESCRIPTION

Figure 1:
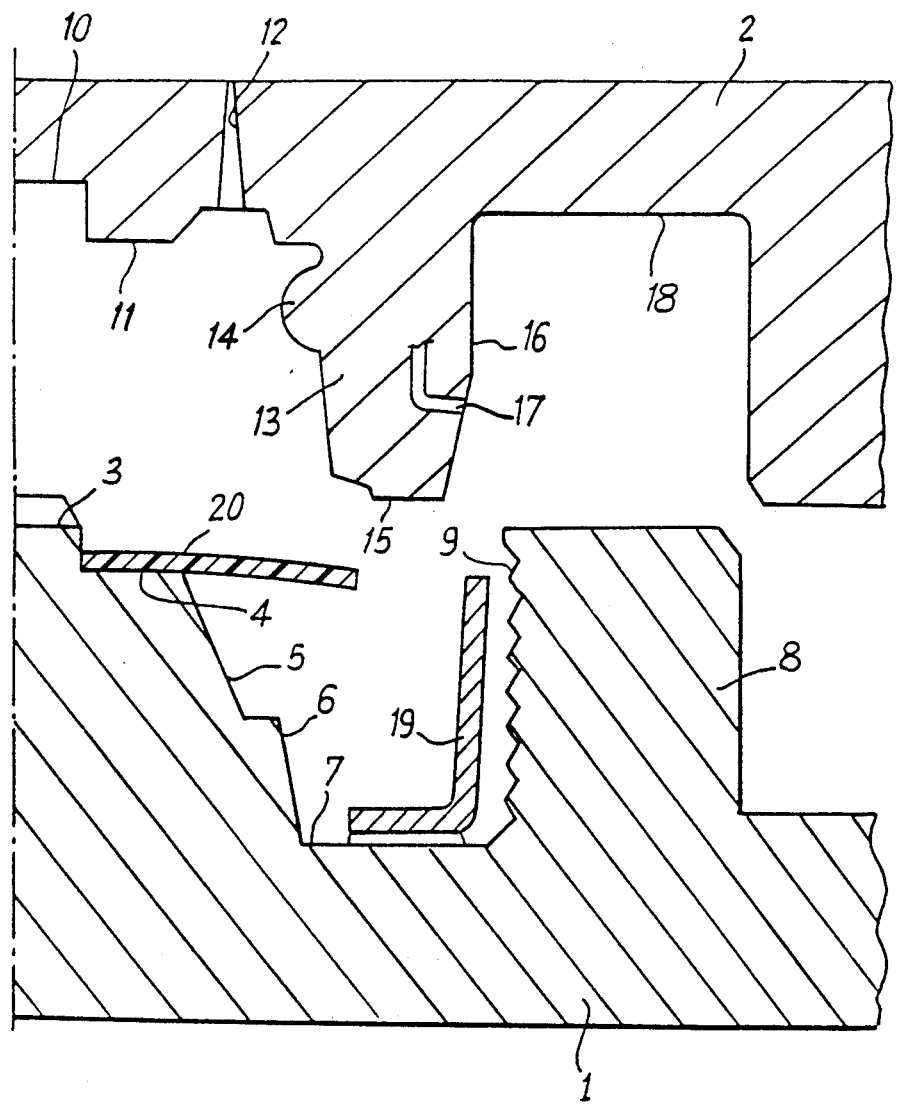
FIG. 1 shows in half-section, a schematic view of an opened mold for the implementation of the first step of the process according to the invention.
Figure 2:
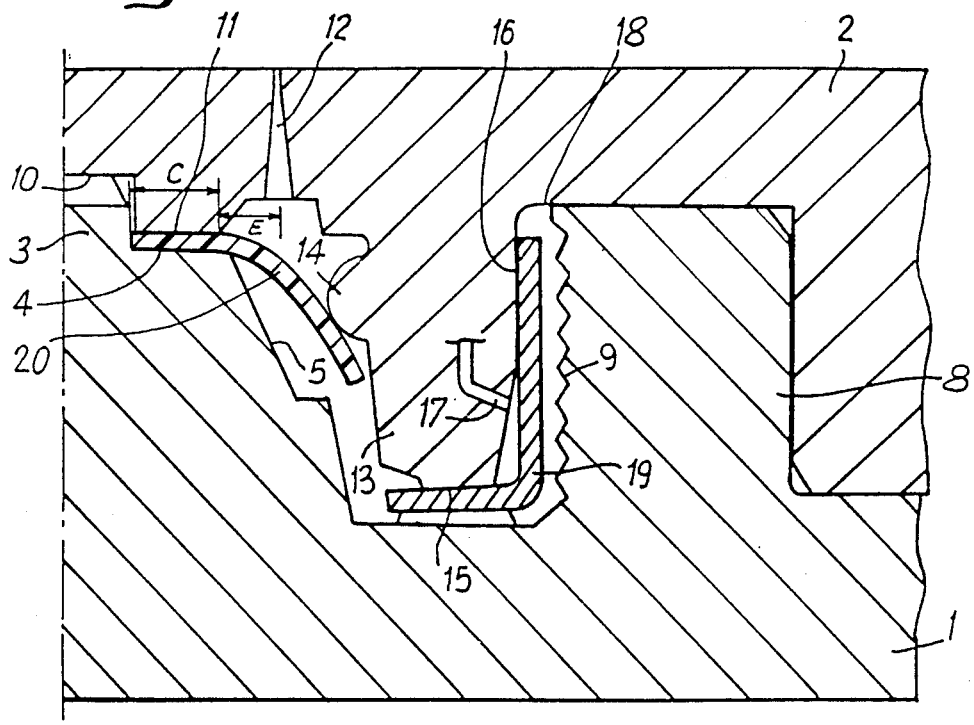
FIG. 2 is a view similar to FIG. 1 showing the mold closed during a second step of the process.
Figure 3:
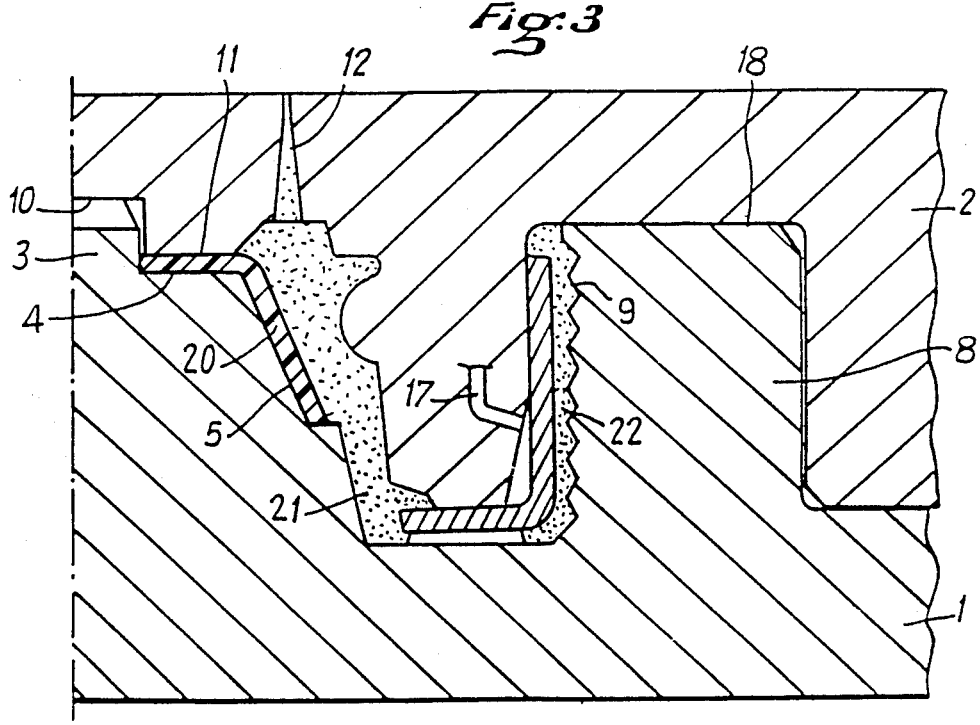
FIG. 3 is a view similar to FIG. 2 and showing the injection step.

Reference will first be made to FIGS. 1 to 3.

These FIGS. show a mold composed of a lower part 1 and an upper part 2.

The lower part 1 has a central tenon or locating post 3, a horizontal annular clamping on bearing surface 4, a truncated or frustoconical side surface 5 having a step 6 and a lower annular bearing or support surface 7.

The lower part 1 of the mold also has a cylindrical portion 8 having a vertical cylindrical side surface 9 provided with a profiling in the example shown.

The truncated side 5 can also be provided with a profiling in the form of hollow and/or relief patterns, designed to make, in a known manner, a hydrodynamic pumping configuration on the seal bearing surface of the ring which is made.

The upper part 2 of the mold has an axial cylindrical recess 10 whose dimensions correspond to those of tenon 3 of lower part 1, a horizontal annular bearing or clamping surface 11 facing the corresponding bearing surface 4 of lower part 1 of the mold, and several injection channels 12 spaced circumferentially and outwardly of clamping surface 11. The mold part 2 also has a downwardly projecting annular portion 13, having in its inner wall a projection 14 in the shape of a bead to form a groove in the ring for a gasket spring, a horizontal lower bearing surface 15, and an outer bearing surface 16 which is at least partially cylindrical and through which opens a conduit 17 to be connected in operation to a vacuum pump (not shown).

The upper part 2 of the mold also has an annular groove or recess 18 corresponding to portion 8 of the lower part 1 of the mold.

For the implementation of the process according to the invention, there are placed in the open mold, as shown at FIG. 1, on the one hand a frame or reinforcement 19, usually metal, and a resin disk or washer 20, especially of PTFE, centered on tenon 3 and supported by horizontal annular bearing surface 4.

The upper surface of disk 20 has previously been attacked or etched chemically to reduce its non-adhesive properties and thus allow its adhesion to the material which forms the body of the seal lip. Such a chemical attack is, for example, described in German Pat. No. 33 29 386. The upper chemically attacked surface of disk 20 can also be coated with a sizing or priming product.

In the following step of the process according to the invention, as shown at FIG. 2, the mold is closed so as to grip and forcibly clamp disk 20 between the facing bearing or clamping surfaces 4 and 11.

The mold is designed to cause sufficient compression or squeezing that the reduction in thickness of the disk in its clamped crown part when the mold is closed is 3% to 9% of the thickness of the disk originally placed in the mold.

Bearing surfaces 4 and 11 are also of such dimensions that the resin disk is pinched on a crown C, which, for usual disks, has a width of between about 4 and 15 mm, preferably on the order of 9 mm.

In this step of closing the mold, frame 19 is centered and positioned by horizontal bearing surface 15 and vertical side 16.

A material such as an elastomer is then injected through channels 12 to form, in the example shown, body 21 of the rim or lip of the seal ring, and the outer facing 22.

Injection channels 12 are off-center and the distance E measured radially between an injection channel and the outer edge of the clamping surface 11 is preferrably equal to at least four times the thickness of resin disk 20 before it is molded.

Thus in one particular embodiment in which a resin disk with a width of 16 mm and a thickness of 0.5 mm is used, distance E equals 2 mm, and the width of the clamped crown C of the disk is 7 mm.

Under the effect of the pressure of the material, especially elastomer, injected through channels 12, the unpinched or free portion of disk 20 is pressed against truncated side surface 5 of lower part 1 of the mold in a perfectly determined position.

Figure 4:
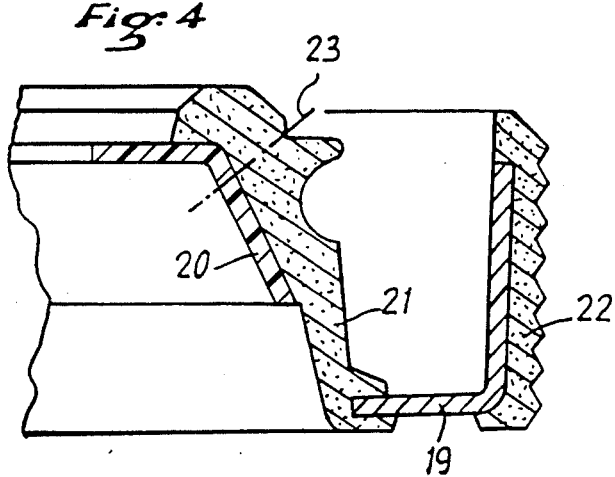
FIG. 4 is a half-sectional view of a seal ring obtained by the process, using the mold of FIGS. 1 to 3.

After opening the mold and ejection, one obtains a part such as that shown at FIG. 4.

The excess portion of the rim is eliminated by cutting as shown at 23, in a conventional manner.

Figure 5:
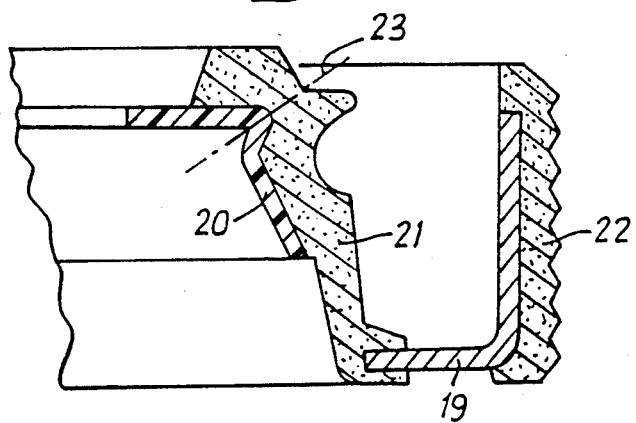
FIG. 5 is a view similar to FIG. 4 of one variant of a ring which can be made according to the invention.

In the variation shown at FIG. 5, which can be obtained from the mold of FIGS. 1 to 3 with a simple modification of the shape of wall 5, a ring with a seal rib or ridge is formed directly by shaping in the mold, the cutting at 23 then being carried out beyond the ridge.

Figure 6:
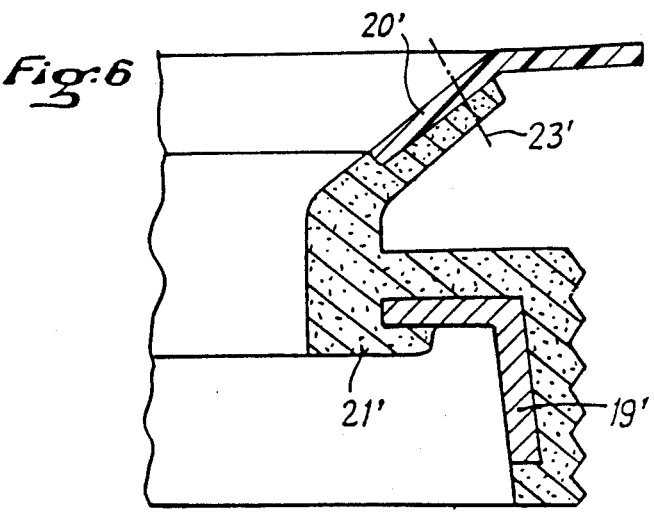
FIG. 6 is a view similar to FIGS. 4 and 5, and showing another type of ring which can be made according to the invention.

FIG. 6 shows a ring with an axial lip which can also be obtained using the process according to the invention, the ring being obtained in the same way, by placing in a mold shaped for this purpose, a frame 19' and resin disk 20'. The molding is then done in the same way as was described in reference to FIGS. 1 to 3, by the injection of material 20' which forms the body of the seal lip and, in the example shown, also the outer covering of the frame. A mold with an annular third part, seat on the lower part could be used to facilitate inserting the frame 19'. The clamping surface for the disc would then be at the upper surface of the third part and would extend inwardly beneath the disc and over the frame 19'.

It will be understood that according to the invention numerous configurations of rings can be made, allowing the manufacture of axial, radial, or external seals.

The process can also be used with various types of materials for the body of the seal lip, and in particular it is possible to cite elastomers of the nitrile, polyacrylic, silicon, or fluorine-containing types.

According to the invention it is also possible to make the outer covering 22 (FIGS. 4 and 5) of a material different from that constituting lip 21, by providing a second series of injection channels suitably placed.

Although the invention has been described in connection with a particular embodiment, it is of course in no way thereby limited and can undergo numerous variations and modifications without exceeding either its scope or its spirit.

We claim:

1. A process of molding a seal ring comprising, the steps of; positioning a reinforcement in a first mold part, positioning a disc of low friction material in the first mold part, closing the mold with a second mold part to clamp a width C of between about 30% and 70% of the width of the disc between opposed clamping surfaces of the first and second mold parts, drawing a vacuum in the interior of the mold, injecting a plastic material into the mold to form a seal lip connecting the disc of low friction material to the reinforcement, opening the mold and removing the molded ring, and cutting off from the molded ring, an excess portion of the molded lip, and at least that portion of the disc which was clamped between the opposed clamping surfaces of the mold wherein said injecting step comprises injecting the plastic material through circumferentially spaced injection channels on the second mold, said injection channels being spaced radially from the portion of said disc which is clamped between the clamping surfaces of the mold parts.

2. A process according to claim 1 wherein, said step of positioning a reinforcement comprises positioning a metal reinforcement in the first mold part, and said step of positioning a disc comprises positioning a disc containing PTFE in the first mold part.

3. A process according to claim 2 wherein, said disc comprises an annular disc, and said step of positioning comprises positioning the annular disc on a locating projection of the first mold part.

4. The process of claim 1, wherein said injection channels are spaced radially from the portion of the disc which is clamped between the clamping surfaces of the mold parts by a distance at least four times the thickness of said disc.

5. A process according to claim 2 wherein, said step of closing the mold and clamping the disc comprises, clamping the disc between the opposed mold parts to compress and reduce the thickness of the clamped portion of the disc by about 3% to 9% of the original thickness of the disc.

* * * * *